United States Patent [19]

Linssen

[11] Patent Number: 4,893,061
[45] Date of Patent: Jan. 9, 1990

[54] SWITCHING ARRANGEMENT

[75] Inventor: Henricus M. H. Linssen, Eindhoven, Netherlands

[73] Assignee: U.S. Philips Corporation, New York, N.Y.

[21] Appl. No.: 194,632

[22] Filed: May 16, 1988

[30] Foreign Application Priority Data

Jun. 11, 1987 [NL] Netherlands ............ 8701358

[51] Int. Cl.⁴ ............................. H05B 37/00
[52] U.S. Cl. ............................. 315/227 R; 315/207; 315/243
[58] Field of Search ............ 315/207, 227 R, 240, 315/241 R, 242, 243, 244

[56] References Cited

U.S. PATENT DOCUMENTS 3,894,266  7/1975  Souza ............................ 315/227
4,037,136  7/1977  Hoene ............................ 315/241 P

FOREIGN PATENT DOCUMENTS 1423978  11/1964  France.

Primary Examiner—David Mis
Attorney, Agent, or Firm—Bernard Franzblau

[57] ABSTRACT

A switching arrangement suitable for the ignition and operation of at least one high-pressure discharge lamp, which arrangement is provided with a branch comprising a capacitor parallel to the lamp. The capacitor is also connected to a charge voltage source. The branch comprising a capacitor includes a gas-filled breakdown element. During ignition of the lamp current can be supplied from the capacitor to the lamp, while in the operating condition of the lamp the capacitor is switched off.

4 Claims, 2 Drawing Sheets

SWITCHING ARRANGEMENT

BACKGROUND OF THE INVENTION

This invention relates to a switching arrangement for ignition and operation with a stable discharge of at least one high-pressure discharge lamp, which arrangement is provided with at least two lamp connection points interconnected by a branch comprising a capacitor and a switching element, the capacitor also being connected to a charge voltage source.

A switching arrangement of the kind mentioned in the opening paragraph is known from European Patent 0 111 956 which corresponds to U.S. Pat. No. 4,816,721 (3/28/89). In this case, a transistor is arranged as a switching element between the capacitor and the connected lamp. In the known switching arrangement, the switching transistor is switched in such a way that current is supplied from the capacitor each time that the rectified supply alternating voltage approaches the value zero. This assists in the maintenance of residual ionization of the gaseous filling of the lamp and hence the re-ignition of the discharge upon as the alternating supply voltage increases to its peak value.

Such assistance in the re-ignition is conducive to a rapid starting of the high-pressure discharge lamp. The term "starting" is in this description to be understood to mean the behaviour of the lamp between the first breakdown upon ignition and the situation of a stable discharge. When a switching element is arranged in the electrical connection between the capacitor and the lamp, it is achieved that the supply of current from the capacitor can be limited in time, which is favourable with respect to dissipation in the switching arrangement.

Upon ignition and hot re-ignition of a high-pressure discharge lamp, the following stages can be recognized:
  (a) non-ignited lamp; voltage across the lamp is equal to the supply voltage;
  (b) breakdown in the lamp due to ignition pulse; the voltage across the lamp decreases abruptly to a few tens of volts;
  (c) the starting of the lamp; the voltage across the lamp increases after the abrupt decrease to a value associated with a stable discharge in the lamp; the supply of current is then taken over by the source of supply.

At the stage (c), for different types of lamps the phenomenon occurs that the voltage across the lamp increases rapidly to far above the value associated with a stable discharge and then decreases gradually to the value of the stable discharge. This phenomenon occurs especially upon hot re-ignition of low-power high-pressure sodium and high-pressure metal halide lamps.

For a lamp having a nominal voltage of 100 V with a stable discharge, the voltage across the lamp immediately after breakdown can increase to 500 V. Due to the strong increase of the voltage across the lamp, the lamp discharge will extinguish unless measures have been taken to supply a current to the lamp such that the discharge is maintained.

In general, discharge lamps are operated in connection with a stabilization ballast having an inductive characteristic. Supply of current immediately after breakdown in the lamp by the source of supply will become operative comparatively slowly in these conditions. Therefore, the take-over of current supply by the source of supply is a critical point in ignition and starting of a high-pressure discharge lamp.

With the use of high-pressure discharge lamps, for example for interior illumination or car illumination, not only a rapid starting, but also a hot re-ignition is required. A hot re-ignition of a lamp is the ignition of the lamp a short time after it has been extinguished by interruption of the supply voltage, while substantially no residual ionization is present in the gaseous filling of the lamp. Due to the fact that the gaseous filling of the discharge lamp still has a comparatively high temperature and hence also a comparatively high pressure, the ignition voltage is correspondingly high. The use of ignition pulses of a few kV to a few tens of kV has consequently proved to be inevitable in practice.

Another aspect of the use of high-pressure lamps for the said applications is the desire that the lamp emits light immediately upon ignition. A measure to achieve this consists in adding to the gas filling of the lamp xenon having a pressure at room temperature of at least 6.7 kPa. This also results in an increase of the ignition voltage. This further results in a large rise in the level to which the voltage across the lamp increases immediately after breakdown.

Supply of current immediately after the first breakdown is found to be of major importance for ignition of such a lamp having a very high ignition and re-ignition voltage. In order to achieve this, the delay between breakdown of the lamp and switching of a switching element in series with the capacitor will have to be a minimum. Semiconductor elements used as the switching element generally switch comparatively slowly, however, or if they are of a rapid-switching type, they are very expensive. An additional disadvantage of the use of a switching transistor is the necessity of a control circuit, which in itself also has a delaying effect.

SUMMARY OF THE INVENTION

The invention has for an object to provide a means by which it is possible in a simple manner to supply current to the lamp from the capacitor very soon after breakdown in the lamp while maintaining the use of a switching element. For this purpose, according to the invention, in a switching arrangement of the kind mentioned in the opening paragraph, the switching element is a gas-filled breakdown element.

The switching arrangement has the advantage that a control circuit is superfluous and that a very rapid supply of current can take place. A further advantage is that such breakdown elements exhibit a good resistance to high voltages.

High-pressure discharge lamps having a low nominal power are generally operated at a higher frequency with respect to the frequency of the conventional supply mains. A supply with a non-sinusoidal voltage is also frequently used for such lamps. In such conditions, measures that assist re-ignition are generally not necessary. Therefore, the breakdown voltage of the breakdown element can be chosen to be so high that breakdown takes place only upon the occurrence of an ignition pulse. This has for its advantage that for the choice of the size of the capacitor only the ignition and starting behaviour of the lamp is of importance.

In order to achieve that in the conductive state of the breakdown element the discharge of the capacitor extends over a sufficiently long time, it may be advantageous to connect in series with the capacitor an impedance, for example a resistor and/or an induction coil.

Preferably, this impedance is arranged so that only the discharge current of the capacitor flows through the impedance, but that the charge current derived from the charge voltage source does not flow through said impedance.

The charge voltage source may be constituted by the source of supply. In order to increase the voltage across the capacitor, a voltage-increasing network, for example a cascade arrangement composed of diodes and capacitors, may be arranged between the capacitor and the source of supply. Another possibility is that the source of supply is a voltage-increasing converter. The use of a separate charge voltage source is also conceivable. Combinations of the aforementioned possibilities may also be used.

BRIEF DESCRIPTION OF THE DRAWINGS

An embodiment of the invention will be described more fully with reference to the accompanying drawing. In the drawing.

DESCRIPTION OF THE PREFERRED EMBODIMENTS

Figure 1:
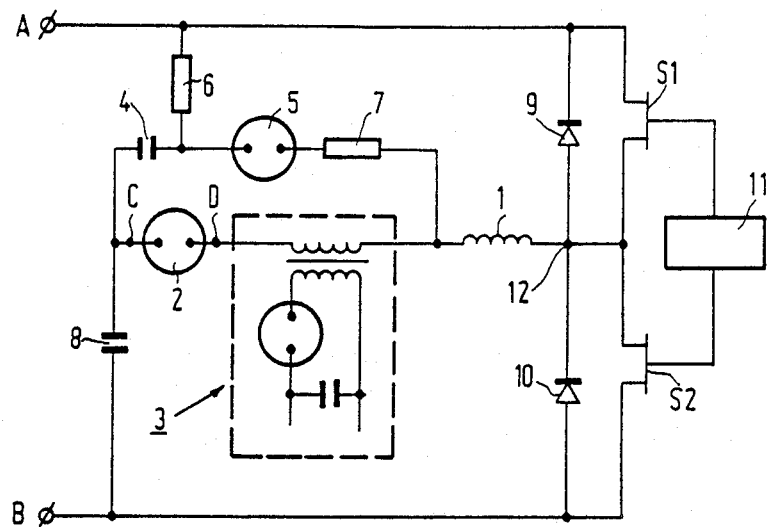
FIG. 1 shows a circuit diagram of the switching arrangement according to a first embodiment of the invention.

In FIG. 1, A and B denote connection points for the connection of a direct voltage source, while C and D denote lamp connection points between which the lamp 2 is connected. The lamp connection point C is connected to the connection point B via a capacitor 8. The lamp connection point D is connected to the connection point A via a parallel-combination of a switch S1 and a diode 9. The connection point B is connected on the one hand via a diode 10 to the diode 9 and on the other hand via a switch S2 to the switch S1. A series-combination of a starter 3 and a stabilization coil 1 is arranged between the lamp connection terminal D and a junction point 12 between the diode 9 and the diode 10. A branch comprising a capacitor and constituted by a capacitor 4, a breakdown element 5 and an impedance 7 is connected parallel to the lamp 2 and the starter 3. A junction point between the capacitor 4 and the breakdown element 5 is connected through a resistor 6 to the connection terminal A. The switches S1 and S2 are controlled via a control circuit 11. The switching arrangement shown is a commutating forward converter.

In a practical embodiment, the connected lamp is a high-pressure metal halide discharge lamp with a 5 bar xenon addition at 300 K. and a nominal power of 35 W at a lamp voltage of 90 V. The light emitted by the lamp has a colour temperature of about 2500 K. and a colour rendition index $R_a$ of more than 80. The switching arrangement is connected to a direct voltage supply of 300 V. The switches S1 and S2 are in the form of MOS-FET's and are switched during operation alternately at a frequency of 25 kHz. Commutation of the lamp current takes place by alternately switching each of the switches S1 and S2. The commutation takes place at a frequency of 100 Hz in the practical embodiment. The capacitor 8 has a value of 47 $\mu$F; the stabilization coil 1 has a value of 17 mH. The capacitor 4 has a value of 10 nF and the resistor 6 amounts to 40 k$\Omega$. The breakdown element is a gas-filled breakdown cartridge having a breakdown voltage of 350 V. The impedance 7 is in the form of a resistor of 10$\Omega$.

The starter 3, which is of known form, is dimensioned so that ignition pulses of 15 kV are produced. The ignition pulses produced are applied across the lamp 2 and the series combination of the impedance 7, the breakdown element 5 and the capacitor 4. Upon the occurrence of an ignition pulse, the breakdown element 5 will break down and pass to the conductive state.

During starting of the lamp, only the switch S1 is switched at a high frequency and commutation does not take place. For assisting the ignition, the capacitor 8 may be shortcircuited during the ignition by a switch not shown in the drawing.

In another practical embodiment, the connected lamp is a 35 W high-pressure metal halide discharge lamp with an addition of Xe at a pressure at 300 K. of 10 bar. The resistor 6 in this case is not connected to the connection terminal A, but is connected to a separate charge voltage source of 1000 V. The value of the resistor 6 has increased to 150 k$\Omega$. In this case, the value of the capacitor 4 is 150 nF. The impedance 7 is now in the form of a series-combination of a resistor of 150$\Omega$ and a coil of 1 mH. The breakdown element 5 has a breakdown voltage of 1200 V.

Figure 2:
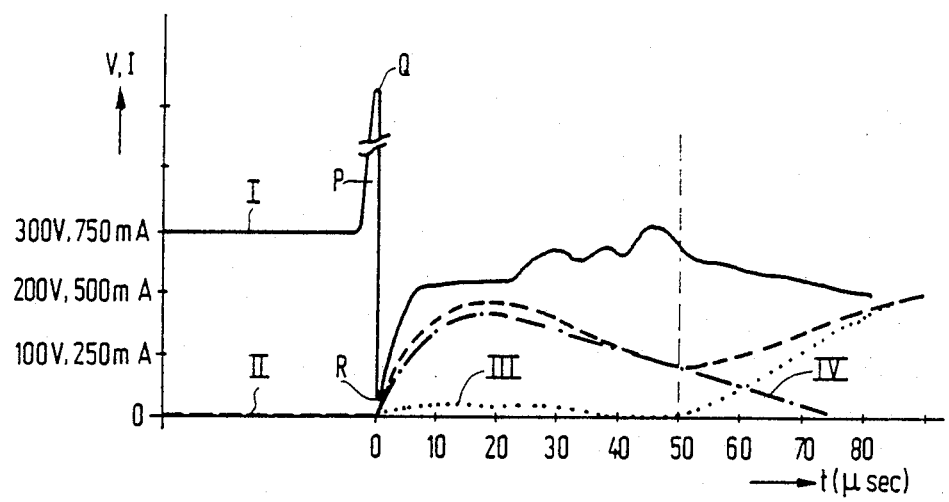
FIG. 2 shows a graph of the voltage across the lamp and the current through the lamp during the ignition phase as a function of time.

In FIG. 2, for the practical lamp having a nominal power of 35 W with a 5 bar xenon addition, the variations of voltage and current are shown. The voltage across the lamp in volts (V) and the current through the lamp in mA, respectively, are plotted on the ordinate, while the time in $\mu$sec is plotted on the abscissa. The curve I indicates the voltage across the lamp and the curve II indicates the current through the lamp, while the curve III indicates the part of the current supplied by the converter and the curve IV indicates the part of the current supplied by the capacitor 4. The voltage pulse at P is the ignition pulse, which in this case amounts to 15 kV. Breakdown in the lamp takes place at Q, after which the voltage decreases abruptly to a few tens of volts at R, whereupon it increases rapidly and thereafter decreases slowly after some time. In the practical case, the nominal voltage was reached after about 1 sec. By using a smaller value for the stabilization coil 1, the part of the current supplied by the converter can increase more rapidly along the curve III. Thus, it can be achieved that the supply of current is taken over more rapidly. However, a disadvantage is that consequently the ripple on the current through the lamp also increases, as a result of which there is a risk that instabilities due to acoustic resonance may occur.

Figure 3:
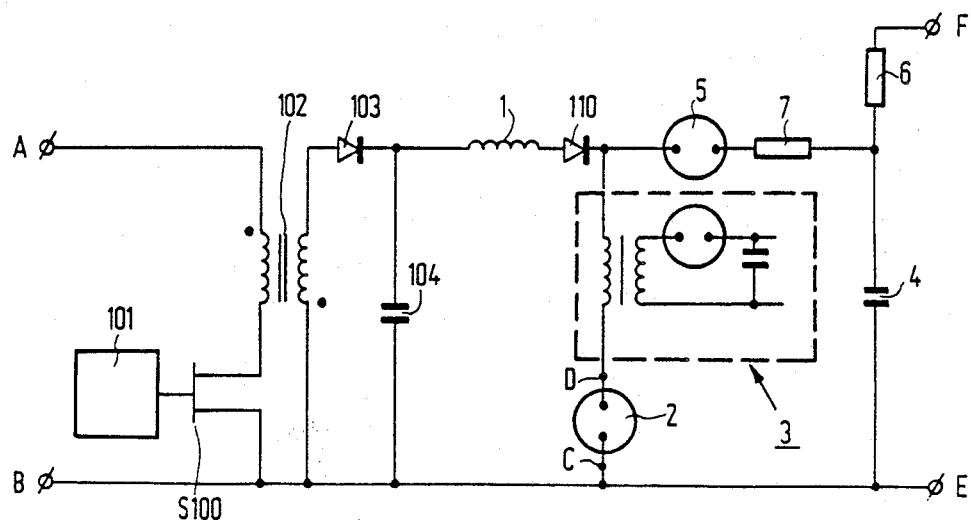
FIG. 3 shows a circuit diagram of a variation of the switching arrangement according to the invention.

FIG. 3 shows a variation of a switching arrangement according to the invention. The elements corresponding to FIG. 1 are designated accordingly. In this case, a fly-back converter is used, which is suitable for operation of a 35 W high-pressure metal halide discharge lamp with xenon at a pressure at 300 K. of 6 bar. The converter, composed of a transformer 102, a switch S100, a control circuit 101, a diode 103 and a capacitor 104, is suitable to be supplied via 12 V accumulator which is to be connected to the connection points A and B. The inductor 1 in series with the starter 3 is connected between the converter and the lamp connection point D. A diode 110 is arranged between the inductor 1 and the starter 3. The converter produces a maximum voltage of about 185 V across the capacitor 104. The switching arrangement is further provided with connection pins E and F for connection of a charge voltage source of 1500 V for charging the capacitor 4. The breakdown element 5 has a breakdown voltage of 1600 V.

An additional advantage of a breakdown voltage element in the arrangements described in that as a result the whole current flowing through the inductor 1 is utilized for the lamp 2 and does not serve under given circumstances to charge the capacitor 4.

In the embodiments described, the starter is constructed so that the ignition pulses are produced in series with the lamp by means of a transformer. However, the invention is not limited to the use of such a starter. Starters, in which the ignition pulses are produced parallel to the lamp and/or are applied by means of an antenna to the discharge vessel of the lamp, may also be used in switching arrangements according to the invention.

What is claimed is:

1. A switching arrangement for ignition and operation with a stable discharge of at least one high-pressure discharge lamp comprising: at least two lamp connection points interconnected by a branch circuit comprising a capacitor and a switching element, a ballast impedance, means for connecting said ballast impedance in series circuit with said two lamp connection points to a pair of voltage supply terminals for the switching arrangement, and means connecting the capacitor to a charge voltage source via a charge circuit that excludes said ballast impedance, characterized in that the switching element is a gas-filled breakdown element.

2. A switching arrangement as claimed in claim 1, which further comprises at least one controlled semiconductor device coupled to said pair of voltage supply terminals and to at least one of said lamp connection points via said ballast impedance connection points, and a high voltage ignition circuit coupled to said lamp.

3. A switching arrangement as claimed in claim 2, further comprising an impedance element connected in series with the capacitor in said branch circuit, and wherein said pair of voltage supply terminals provide a DC supply voltage operative as said charge voltage source for the capacitor, and said charge circuit connects the capacitor to said voltage supply terminals in a manner that excludes said impedance element from the capacitor charge circuit.

4. A switching arrangement as claimed in claim 1, wherein said breakdown element has a breakdown voltage which is higher than the operating voltage of a connected high-pressure discharge lamp in the normal operating condition of said lamp.

* * * * *